United States Patent
Hsu et al.

(10) Patent No.: US 10,163,248 B1
(45) Date of Patent: Dec. 25, 2018

(54) IMAGE PROCESSING METHOD AND SCANNING SYSTEM USING THE SAME

(71) Applicant: Microtek International Inc., Hsinchu (TW)

(72) Inventors: Cheng-Hsun Hsu, Hsinchu (TW); Huei-Chuan Tai, Hsinchu (TW)

(73) Assignee: MICROTEK INTERNATIONAL INC., Hsinchu (TW)

(*) Notice: Subject to any disclaimer, the term of this patent is extended or adjusted under 35 U.S.C. 154(b) by 0 days.

(21) Appl. No.: 15/667,213

(22) Filed: Aug. 2, 2017

(51) Int. Cl.
| | |
|---|---|
| G06T 3/00 | (2006.01) |
| G06T 7/50 | (2017.01) |
| H04N 1/00 | (2006.01) |
| G01B 11/24 | (2006.01) |
| G06T 15/20 | (2011.01) |

(52) U.S. Cl.
CPC .......... *G06T 15/205* (2013.01); *G06T 3/0043* (2013.01); *G06T 7/50* (2017.01); *H04N 1/00135* (2013.01); *G01B 11/24* (2013.01)

(58) Field of Classification Search
CPC ............ G06F 17/30241; G06F 3/0482; G06F 3/04842; G06F 3/04847; G06F 3/14; G06K 2009/00644; G06K 9/00476; G06K 9/0063; G06K 9/40; G06K 9/52; G06T 11/001; G06T 11/206; G06T 11/60; G06T 19/006; G06T 3/4038; G06T 15/00; H03M 7/4006; H04N 13/0022; H04N 13/0048; H04N 13/0271; H04N 19/12; H04N 19/126; H04N 19/134; H04N 19/14; H04N 19/174; H04N 19/176; H04N 19/36; H04N 19/46; H04N 19/597; H04N 19/60; H04N 19/85; H04N 1/41; H04N 1/60; H04N 1/603
USPC ........... 375/E7.226; 382/166, 239, 240, 113, 382/232, 237, 251, 276, 302; 345/582, 345/46; 358/518
See application file for complete search history.

(56) References Cited

U.S. PATENT DOCUMENTS

| | | | | |
|---|---|---|---|---|
| 7,423,236 | B2 * | 9/2008 | Suh | B23K 26/032 219/121.64 |
| 2001/0020950 | A1 * | 9/2001 | Shimizu | G06T 3/403 345/611 |
| 2002/0114527 | A1 * | 8/2002 | Horie | H03M 7/4006 382/239 |
| 2004/0021882 | A1 * | 2/2004 | Kakutani | H04N 1/6019 358/1.9 |
| 2009/0086190 | A1 * | 4/2009 | Kodama | G01B 11/00 356/28 |
| 2009/0167866 | A1 * | 7/2009 | Lee | G06K 9/3233 348/159 |

(Continued)

*Primary Examiner* — Negussie Worku
(74) *Attorney, Agent, or Firm* — Birch, Stewart, Kolasch & Birch, LLP (57) ABSTRACT

A scanning system comprises a scanning device and a computing device. The scanning device scans an object to produce an original image, wherein the original image contains a plurality of colors. The computing device is electrically connected to the scanning device and performs an image processing method including steps: receiving the original image generated by the scanning device; specifying a number of the plurality of layers; assigning each color of the original image to one of the plurality of layers; determining a height of each layer; and mapping the height of each layer to the original image based on each color contained by each layer to produce a height image.

19 Claims, 5 Drawing Sheets

(56) References Cited

U.S. PATENT DOCUMENTS

| | | | | |
|---|---|---|---|---|
| 2011/0058717 | A1* | 3/2011 | Dunavent | G06T 7/0014 |
| | | | | 382/128 |
| 2011/0069333 | A1* | 3/2011 | Katayama | H04N 1/6055 |
| | | | | 358/1.9 |
| 2012/0189165 | A1* | 7/2012 | Sun | G06K 9/00362 |
| | | | | 382/103 |
| 2012/0250040 | A1* | 10/2012 | Yamazaki | B41J 2/2135 |
| | | | | 358/1.8 |
| 2013/0235186 | A1* | 9/2013 | Chen | G06T 7/001 |
| | | | | 348/126 |
| 2014/0268241 | A1* | 9/2014 | Kakutani | G06K 15/1881 |
| | | | | 358/3.06 |
| 2016/0167414 | A1* | 6/2016 | Yanai | B41J 29/38 |
| | | | | 347/14 |
| 2017/0006185 | A1* | 1/2017 | Yanai | H04N 1/40 |
| 2017/0252968 | A1* | 9/2017 | Wang | B29C 67/0055 |
| 2018/0070010 | A1* | 3/2018 | Wang | H04N 5/23238 |
| 2018/0160015 | A1* | 6/2018 | Ito | H04N 1/6005 |

* cited by examiner

| L1 | L1 (C0, C1, C2, C3, C4, C5, ...) → L1 (C5) → L1 (H1)

| L2 | L2 (C111, C112, C113, C114, ...) → L2 (C112) → L2 (H2)

| L3 | L3 (C210, C211, C212, C213, ...) → L3 (C213) → L3 (H3)

IMAGE PROCESSING METHOD AND SCANNING SYSTEM USING THE SAME

BACKGROUND OF THE INVENTION

1. Field of the Invention

The present invention relates to an image processing method and a scanning system using the same, particularly to an image processing method and a scanning system using the same, which are able to generate a height image.

2. Description of the Prior Art

There are many methods to convert a planar image into a 3D image. For example, a parallax-based method processes a plurality of planar images corresponding to an identical object to generate a 3D image. While only having a planar image, the user is unlikely to generating a 3D image using the abovementioned method. In order to generate a height image approaching the original image, the conventional image processing methods have to process multifarious information of pixels of the original image, including the information of segments, boundaries, colors, brightness values, and eigenvalues of the images.

Thus, the conventional image processing methods are usually very complicated and need a complex computing system. Therefore, the conventional image processing methods are hard to perform in a slim computing device and a simple scanning system.

Accordingly, it is a target of the industry to develop an image processing method and a scanning system using the same, which are able to generate a height image.

SUMMARY OF THE INVENTION

The present invention provides an image processing method and a scanning system using the same, wherein a computing device is used to generate a plurality of layers respectively having different height values according to a plurality of colors of the original image and then generate a height image.

In one embodiment, the image processing method of the present invention comprises steps: a computing device receiving an original image; specifying a number of multiple layers; the computing device assigning one of the plurality of colors of the original image to one of the multiple layers; determining a height value of one of the multiple layers; and the computing device mapping the height value of one of the multiple layers to the original image according to one of the plurality of colors assigned to one of the multiple layers to generate a height image containing a coordinate value and the height value.

In another embodiment, the scanning system of the present invention comprises a scanning device and a computing device. The scanning device scans an object to generate an original image, wherein the original image contains a plurality of colors. The computing device is electrically connected with the scanning device and configured for receiving the original image generated by the scanning device; specifying a number of multiple layers; assigning one of the plurality of colors of the original image to one of the multiple, layers; determining a height value of one of the multiple layers; and mapping the height value of one of the multiple layers to the original image according to one of the plurality of colors assigned to one of the multiple layers to generate a height image containing a coordinate value and the height values.

Below, embodiments are described in detail in cooperation with the attached drawing to make easily understood the objectives, technical contents, characteristics and accomplishments of the present invention.

DESCRIPTION OF THE PREFERRED EMBODIMENTS

The present invention will be described in detail with embodiments and attached drawings below. However, these embodiments are only to exemplify the present invention but not to limit the scope of the present invention. In addition to the embodiments described in the specification, the present invention also applies to other embodiments. Further, any modification, variation, or substitution, which can be easily made by the persons skilled in that art according to the embodiment of the present invention, is to be also included within the scope of the present invention, which is based on the claims stated below. Although many special details are provided herein to make the readers more fully understand the present invention, the present invention can still be practiced under a condition that these special details are partially or completely omitted. Besides, the elements or steps, which are well known by the persons skilled in the art, are not described herein lest the present invention be limited unnecessarily. Similar or identical elements are denoted with similar or identical symbols in the drawings. It should be noted: the drawings are only to depict the present invention schematically but not to show the real dimensions or quantities of the present invention. Besides, matterless details are not necessarily depicted in the drawings to achieve conciseness of the drawings.

Figure 1:
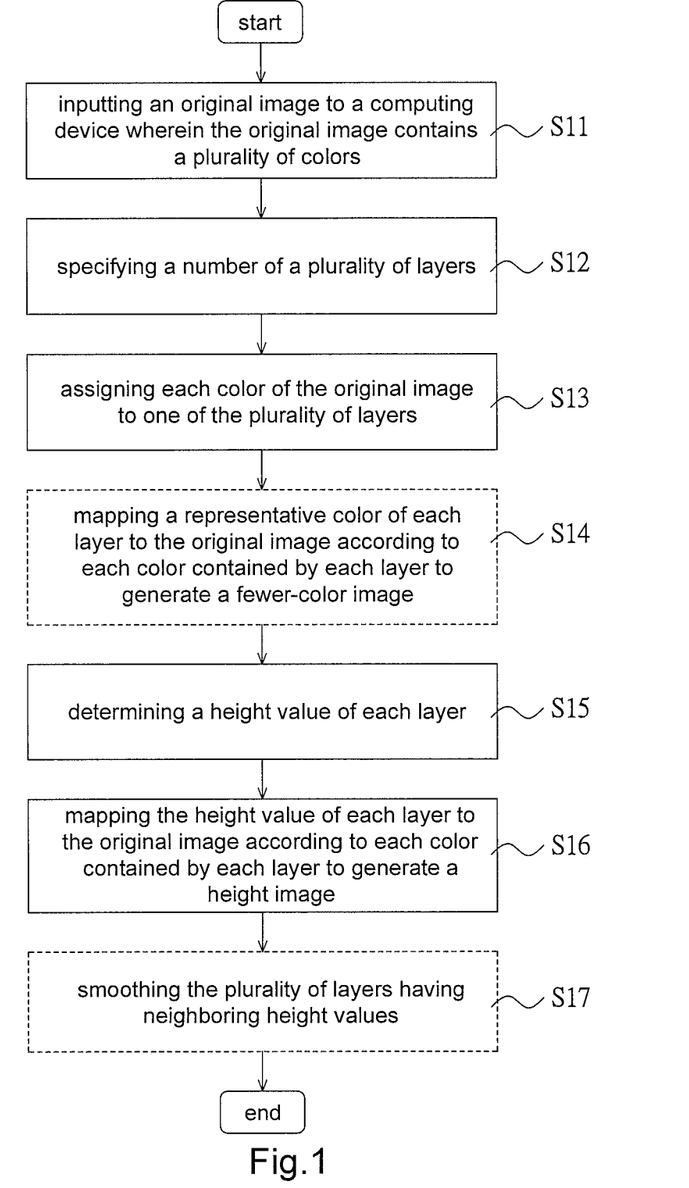
FIG. 1 is a flowchart of an image processing method according to one embodiment of the present invention.
Figure 2:
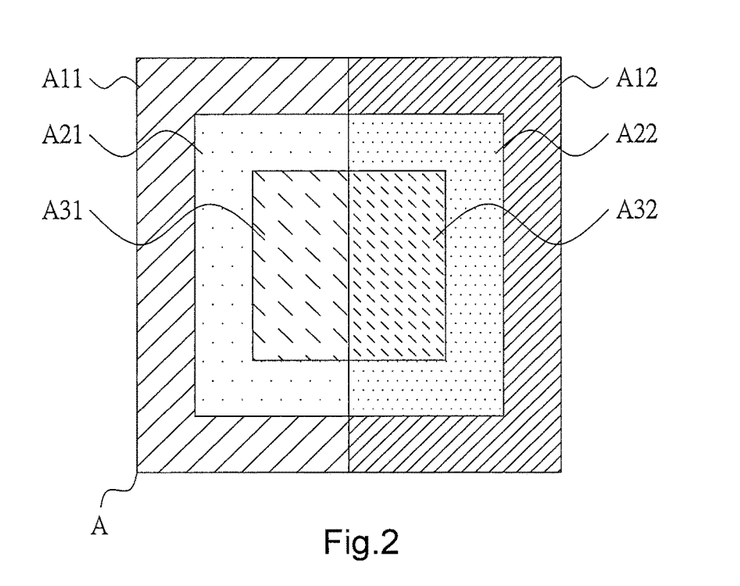
FIG. 2 is a diagram schematically showing an original image according to one embodiment of the present invention.

Refer to FIG. 1 for a flowchart of an image processing method according to one embodiment of the present invention. The image processing method of the present invention comprises Steps S11-S17. In Step S11, input an original image to a computing device, wherein the original image contains a plurality of colors. It should be explained herein: the original image is a 2D colored image free of information of height values. For example, the original image A contains 6 colors: A11, A12, A21, A22, A31 and A32, as shown in FIG. 2. In one embodiment, the original image A is acquired through a camera or a scanning device. In another embodiment, the user inputs the original image A to the computing device. For example, the original image is a publicly-available 2D image downloaded from the Internet.

Figure 3:
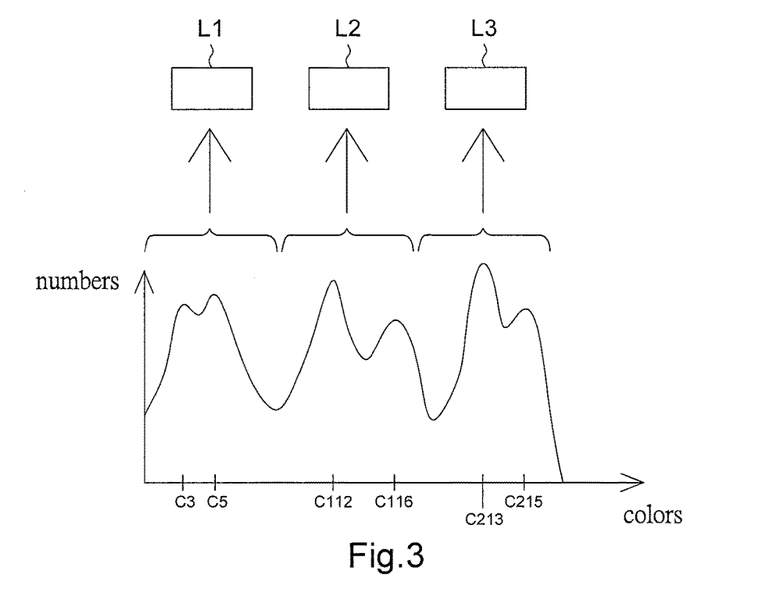
FIG. 3 is a diagram schematically showing a distribution curve of the numbers of pixels with respect to different colors of an original image according to one embodiment of the present invention.

In Step S12, specify a number of a plurality of layers. In one embodiment, the number of the layers is preset by the computing device, determined by the computing device according to the original image, or specified/modified by the user. However, the present invention does not limit the way of determining the number of the layers. Refer to FIG. 3. In one embodiment, according to the distribution curve of the numbers of pixels with respect to different colors of the original image, the computing device uses the relative maximum values (the peaks) to determine the number of the layers, wherein the distribution curve of the numbers of pixels with respect to different colors may be a distribution curve of the numbers of pixels with respect to color levels or the distribution curve of the numbers of pixels with respect to chrominances. However, the present invention is not limited by the abovementioned embodiments. For example, t the distribution curve of the numbers of pixels with respect to different colors in FIG. 3 has 6 peaks in the colors: C3, C5, C112, C116, C213 and C215. Therefore, the computing device automatically determines that the probable number of layers is 6. However, the computing device can also preset the number of layers to be a given value. Alternatively, the user can manually specify the number of layers to be 3, i.e. Layers L1, L2 and L3, as shown in FIG. 3.

Figure 4:
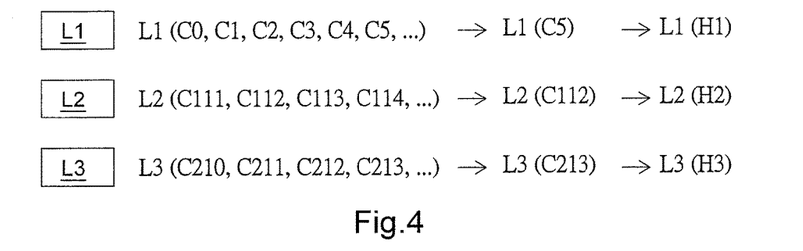
FIG. 4 is a diagram schematically showing a plurality of layers according to one embodiment of the present invention.

In Step S13, the computing device assigns each color of the original image to one of the plurality of layers. Refer to FIG. 3 and FIG. 4. In one embodiment, according to the distribution curve of the numbers of pixels with respect to different colors, the computing device performs a K-means algorithm to assign all the colors of the original image to a plurality of clusters corresponding to the plurality of Layers L1, L2 and L3. For an example, in the distribution curve of the numbers of pixels with respect to different colors of FIG. 3, a plurality of colors C0, C1, C2, C3, C4 and C5 in the left area is assigned to Layer L1; a plurality of colors C111, C112, C113 and C114 in the middle area is assigned to Layer L2; a plurality of colors C210, C211, C212 and C213 in the right area is assigned to Layer L3. However, the present invention is not limited by the example. In other words, in Step S13, the computing device correlates all the colors of the original image with the plurality of Layers L1, L2 and L3, wherein a color is not allowed to be assigned to a plurality of layers but can only be assigned to one layer. However, the computing is allowed to modify the correlation between the colors and the layers according to the instruction of the user. For example, Colors C0 and C1 are not automatically assigned to Layer L1 but are assigned to Layer L3 according to the instruction of the user, wherein a color is still only allowed to be assigned to one layer.

In one embodiment, the computing device uses a tone separation method, such as the posterization method of Photoshop, to assign each color of the original image to one of a plurality of layers, whereby to establish the correlation between colors and layers, wherein a color is not allowed to be assigned to a plurality of layers but can only be assigned to one layer. It is easily understood: the number of clusters must be the third power of n, wherein n is a natural number. If n is equal to 2, each color component (R, G, B) has only two sub-components 0 and 255. Thus are acquired 8 cluster center points (0,0,0), (0,0,255), (0,255,0), (255,0,0), (0,255, 255), (255,255,255), (255,0,255) and (255,255,0). If n is equal to 3, each color component (R, G, B) has 3 sub-components 0, 85, and 255. Thus are acquired 27 cluster center points (0,0,0), (0,0,85), (0,0,255) . . . etc. The total cluster center points can be easily worked out by persons skilled in the art and will not be all enumerated herein.

In one embodiment, the computing device uses a histogram pixel separation method to assign each color of the original image to one of a plurality of layers, whereby to establish the correlation between colors and layers, wherein a color is not allowed to be assigned to a plurality of layers but can only be assigned to one layer. Suppose that the entire image has 900 pixels and that the 900 pixels are to be divided into 3 clusters. Thus, each cluster involves 900/3=300 pixels. Count the numbers of the pixels with respect to histogram levels beginning from 0. While the total number of pixels has reached 300, these pixels are assigned to an identical cluster. Among the identical cluster, one of the histogram levels which has the greatest number of pixels is used as the center point of the identical cluster. However, the present invention is not limited by the abovementioned embodiments or examples. The persons having ordinary knowledge should be able to make modification or variation without departing from the scope of the present invention.

In order to facilitate the user to determine whether to manually modify/specify the correlation between layers and colors, the concepts of abstract layers and color clustering are converted into a concrete fewer-color image to be viewed by the user. The details thereof are described below.

Figure 5:
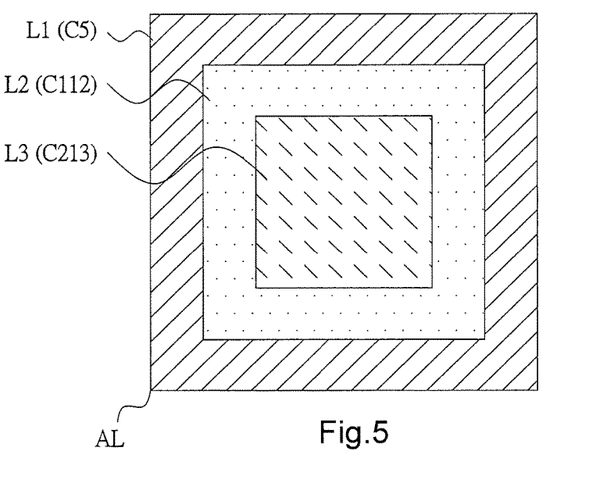
FIG. 5 is a diagram schematically showing a fewer-color image according to one embodiment of the present invention.

In Step S14, the computing device maps the representative color of each layer to the original image according to each color of each layer to generate a fewer-color image. In one embodiment, the representative color of each layer is selected from the colors that the layer contains by the computing device or the user. In another embodiment, a color, which is not contained by a layer, is selected as the representative color of the layer. However, the present invention is not limited by the abovementioned embodiments. Refer to FIG. 2, FIG. 4 and FIG. 5. The original image A is a 2D image with 6 colors. Thus, the information carried by each pixel includes coordinate values and a color. For example, the coordinate values and color of a first pixel is expressed as (X1, Y1, C1); the coordinate values and color of a second pixel is expressed as (X2, Y2, C2). The layer each color belongs to can be learned from the correlation between Layers L1, L2, L3 and the colors of the original image. For example, C1 belongs to Layer L1. Each layer has a representative color only. For example, the representative color of Layer L1 is C5. According to the abovementioned information, the computing device can work out that the coordinate values and the representative color of the first pixel of the fewer-color image AL is (X1, Y1, C5) and that the coordinate values and the representative color of the second pixel of the fewer-color image AL is (X2, Y2, C5). Undertaking the abovementioned steps similarly, the computing device maps the representative colors of the layers to the original image according to the correlation of the layers and the colors to obtain a fewer-color image AL containing the information of the coordinate values and the representative colors of the pixels, as shown in FIG. 5.

It should be further explained: the original image A contains 6 colors: A11, A12, A21, A22, A31 and A32 (as shown in FIG. 2), and the fewer-color image AL is formed by the representative colors of Layers L1, L2 and L3 (as shown in FIG. 5). It is learned via comparing FIG. 2 and FIG. 5: the colors A11 and A12 of the original image A are assigned to an identical Layer L1 in the fewer-color image AL and thus have the same representative color C5. Similarly, the colors A21 and A22 of the original image A are assigned to an identical Layer L2 in the fewer-color image AL and thus have the same representative color C112. The colors A31 and A32 of the original image A are assigned to an identical Layer L3 in the fewer-color image AL and thus have the same representative color C213. Thus, Step S14 processes the original image A containing a plurality of colors into the fewer-color image AL formed by 3 representative colors C5, C112 and C213.

In Step S15, determine a height value of each layer, wherein the height value is automatically generated by the computing device or manually specified by the user. Normally, the human vision feels that the warm colors (such as the color red and the color orange) are closer in distance and that the cool colors (such as the color blue and the color purple) are farther in distance. Moreover, the human vision feels that the object having higher brightness (higher chrominance) is closer in distance and that the object having lower brightness (low chrominance) is farther in distance. Therefore, chrominance or brightness can be used as a reference to calculate height. In one embodiment, the computing device determines the height value of each layer according to the chrominance or brightness of the representative color of the layer, wherein the representative color is selected from the colors contained by the layer or specified by the user. Refer to FIG. 3 and FIG. 4. Via Step S13, Layer 1 contains a plurality of colors C0, C1, C2, C3, C4 and C5; Layer 2 contains a plurality of colors C111, C112, C113 and C114; Layer 3 contains a plurality of colors C210, C211, C212 and C213. Next, the computing device selects a representative color for each layer. Alternatively, the user specifies a representative color for each layer. For example, the representative color of Layer 1 is the color C5; the representative color of Layer 2 is the color C111; the representative color of Layer 3 is the color C213. Next, the height values corresponding to the representative colors are worked out according to the relationship between the representative colors and the visual heights. The abovementioned relationship may be but is not limited to a linear equation or a quadratic equation. Thereby is generated a plurality of height values H1, H2 and H3 corresponding to the plurality of Layers L1, L2 and L3, as shown in FIG. 4.

However, the present invention is not limited by the abovementioned steps. In one embodiment, the user can also customize the height image via giving instructions to the computing device to manually specify the height value of each layer. Therefore, Step S14 of generating a fewer-color image can be omitted in some embodiments, and the computing device or the user can still determine the height value of each layer (Step S15). However, the present invention is not limited by the abovementioned embodiments or examples. The persons having ordinary knowledge should be able to make modification or variation without departing from the scope of the present invention.

Figure 6:
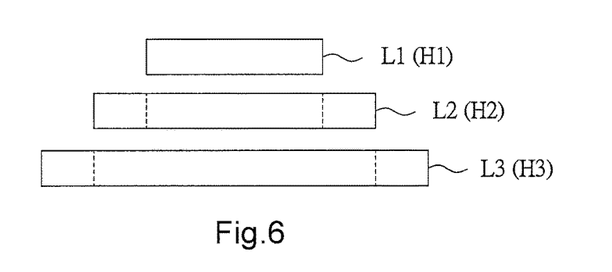
FIG. 6 schematically shows a side view of a height image according to one embodiment of the present invention.

Refer to FIG. 6. In Step S16, the computing device maps the height value of each layer to the original image according to each color contained by each layer to generate a height image. The original image is a 2D image containing a plurality of colors. Thus, the image information of each pixel of the original image includes coordinate values and a color. For example, the coordinate values and color of a first pixel is expressed as (X1, Y1, C1). Further, which layer each color belongs to can be learned according to the correlation between all the colors and the plurality of Layers L1, L2 and L3. For example, C1 belongs to Layer L1. Besides, a layer has only a height value. For example, Layer 1 has a height value of H1. Thereby, the computing device can work out the coordinate values and height value of the first pixel (X1, Y1, H1). Similarly, according to the correlation between layers and colors, the computing device maps the height values of the layers to the original image to generate a height image containing height values, as shown in FIG. 5. In one embodiment, the colors of the original image are not presented on the height image. In other words, the height image has not yet carried the information of colors but only contains coordinate values and height values in this case. It is easily understood: the height image can also carry the colors of the original image. In other words, each pixel of the height image includes a color value and a height value.

However, the height differences of the plurality of layers will generate a sawtooth-like contour while observed from the side view of the height image in FIG. 5. Such a situation may need modification in some applications. For example, while the user inputs the height image into a 3D printer to output a wallpaper having height differences, sharp edges of the sawtooth-like contours may appear on the surface of the wallpaper and result in poor tactile feeling. In Step S17, the computing device smooths the adjacent layers, wherein the heights of the adjacent layers are gradually varied to smooth the layers along the height direction, whereby is generated a smooth height image, which will improve the quality of products in the application of 3D printing. It is easily understood: Step S17 is an optional step, and the user may adopt or abandon the step according to requirement. The present invention is not limited by the abovementioned embodiments or examples.

Figure 7:
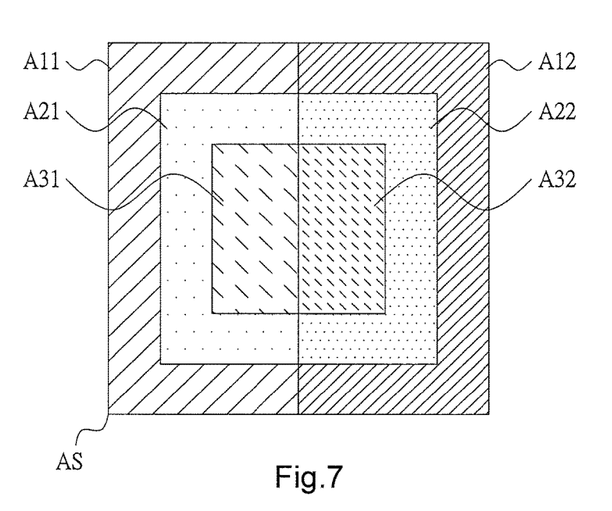
FIG. 7 schematically shows a top view of a 3D image according to one embodiment of the present invention.
Figure 8:
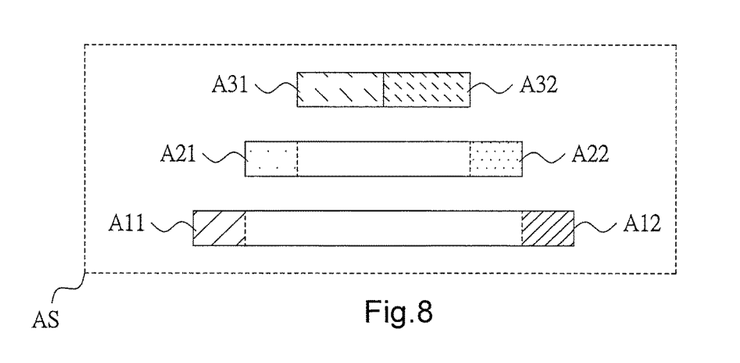
FIG. 8 schematically shows a central section of a 3D image according to one embodiment of the present invention.

Refer to FIG. 7 and FIG. 8. In one embodiment, in order to provide a 3D colored image for the user, the computing device generates a 3D image AS according to the height image. For example, the computing device maps the coordinate values and color values of the pixels of the original image to the coordinate values and height values of the pixels of the height image to generate a 3D image AS. As each pixel of the 3D image AS contains the information of the coordinate values, height value and color value, a plurality of colors A11, A12, A21, A22, A31 and A32 has been presented on the 3D image AS, as shown in FIG. 7 and FIG. 8.

It should be further explained herein: the abovementioned steps are not necessarily undertaken in the sequence of describing them or the sequence of labeling them but can be undertaken in a different sequence. For example, Step S12 in FIG. 1 can be undertaken before Step S11; Step S14 can be undertaken after Step S16. However, the present invention is not limited by the abovementioned embodiments or examples. The persons having ordinary knowledge should be able to make modification or variation without departing from the scope of the present invention.

Figure 9:
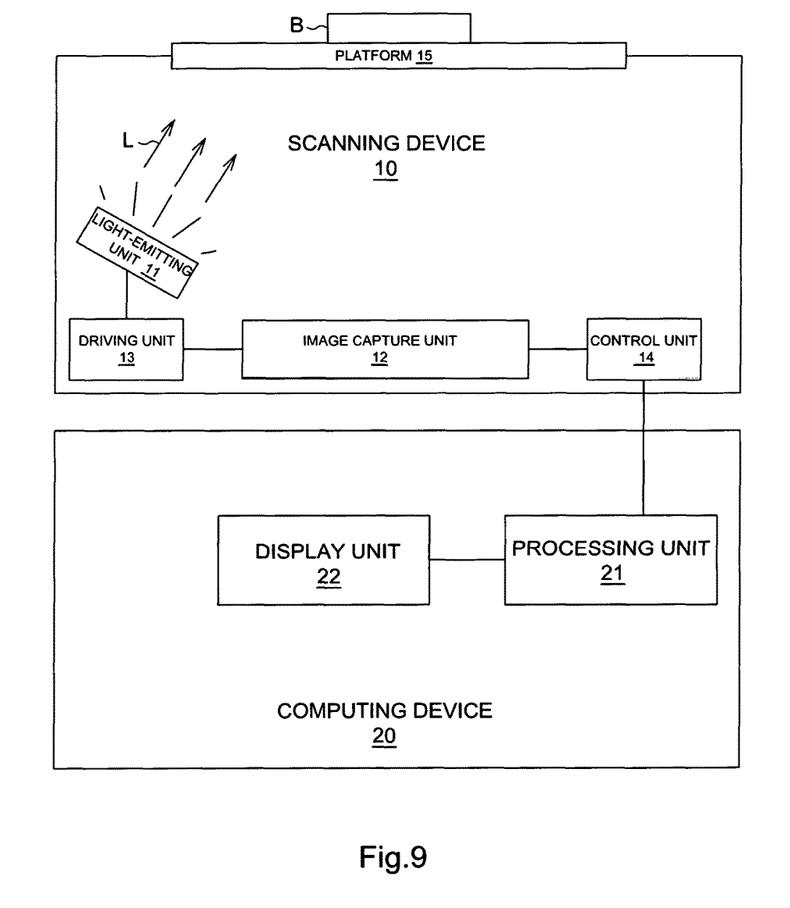
FIG. 9 is a diagram schematically showing a scanning system according to one embodiment of the present invention.

Refer to FIG. 2 and FIG. 9. Below is described a scanning system comprising a scanning device 10 and a computing device 20 according to one embodiment of the present invention. The scanning device 10 scans an object B to generate an original image A, wherein the original image A contains a plurality of colors. In one embodiment, the object B has a planar surface or a 3D surface having height differences. However, the present invention does not particularly limit the state of the surface of the object B. The technical contents and embodiments of processing the original image has been described hereinbefore and will not repeat herein.

The scanning device 10 includes a light-emitting unit 11, an image capture unit 12, a driving unit 13, a control unit 14 and a platform 15. The light-emitting unit 11 generates an illuminating light L to illuminate the surface of the object B. In one embodiment, the image capture unit 12 and the object B are disposed on an identical side of the platform 15, whereby to realize a reflective-type scanning device. In one embodiment, the image capture unit 12 and the object B are disposed on opposite sides of the platform 15, whereby to realize a transmission-type scanning device. In one embodiment, the image capture unit 12 is a linear-type photosensor or a surface-type photosensor. In one embodiment, the image capture unit 12 includes a charge-coupled device (CCD) or a contact image sensor (CIS). However, the present invention is not limited by the abovementioned embodiments. The driving unit 13 drives the image capture unit 12 and the object B to undertake relative movement, whereby to scan the object B. In one embodiment, the driving unit 13 is coupled to the image capture unit 12 and drives the image capture unit 12 to scan the object B. In one embodiment, the driving unit includes a linkage assembly (not shown in the drawings) coupled to the image capture unit 12. In one embodiment, the light-emitting unit 11 is coupled to the driving unit 13 through the linkage assembly and synchronously operates with the image capture unit 12 to scan the object B. The control unit 14 is electrically connected with the image capture unit 12 and controls the image capture unit 12 to generate the original image A. However, the present invention is not limited by the abovementioned embodiments or examples. The persons having ordinary knowledge should be able to make modification or variation without departing from the scope of the present invention.

The computing device 20 is electrically connected with the scanning device 10 and undertakes an image processing method. The image processing method comprises steps: receiving an original image A generated by the scanning device 10; specifying a number of a plurality of layers; assigning each color of the original image A to one of the plurality of layers; determining a height value of each layer; and mapping the height value of each layer to the original image A according to each color contained by each layer to generate a height image. The details and embodiments of the imaging processing method have been described hereinbefore and will not repeat herein.

In one embodiment, the computing device 20 includes a processing unit 21 and a display unit 22. The processing unit 21 is electrically connected with the control device 14 of the scanning device 10 and receives the original image A generated by the scanning device 10. In one embodiment, the processing unit 21 includes a central processing unit (CPU), an application specific processor (ASP), an application specific integrated circuit (ASIC), or a microcontroller unit (MCU). However, the present invention is not limited by the abovementioned embodiments or examples. The processing unit 21 can execute the abovementioned image processing method, such as the image processing method shown in FIG. 1 or FIG. 6.

The display unit 22 is electrically connected with the processing unit 21 and able to present the original image shown in FIG. 2, the distribution curve of the numbers of pixels with respect to different colors shown in FIG. 3, the height image shown in FIG. 5, the fewer-color image AL shown in FIG. 7 and the 3D image AS shown in FIG. 8. The technologies related with the images and distribution curves have been described hereinbefore and will not repeat herein. In one embodiment, the display unit includes a cathode ray tube, a light-emitting diode display device, a crystal liquid display device, or a touch control screen. It should be noted: the scanning device and the computing device can be combined into an integral body. In one embodiment, the scanning unit 21 itself possesses a processing unit 21 and a display unit 22. However, the present invention is not limited by the abovementioned embodiments or examples.

It is easily understood: the high-definition height image generated by the conventional image processing methods may be unable to be used in some applications, such as the application of using a 3D printer to output a relief wallpaper (wallpaper having height differences), i.e. the application of using a 3D printer to output a physical object having height differences. In such a case, what the user needs is not the conventional image processing method that generates high-definition height images but an image processing method and a scanning system using the same wherein the height values can be simplified/specified according to the requirement of the user.

In one embodiment, the scanning system of the present invention comprises a scanning device 10, a computing device 20 and a 3D printer (not shown in the drawings). The 3D printer is electrically connected with the computing device 20 and outputs a physical object having height differences according to a height image or a 3D image. In one embodiment, the 3D printer is a squeeze printer, a powder-based inkjet 3D printer, a deposition 3D printer, or a light-cured resin 3D printer (such as a UV-cured resin 3D printer). However, the present invention is not limited by the abovementioned embodiments or examples.

In conclusion, the present invention proposes an image processing method and a scanning system using the same, wherein a computing device generates a plurality of layers respectively having different height values according to a plurality of colors of an original image, whereby to generate a height image. The present invention can generate a height image, merely using the colors of the original image, exempted from processing additional complicated and multifarious image information. The present invention can further enable the user to specify/modify the height values of a height image, whereby to provide more flexible and practicable solutions of image processing for the user.

What is claimed is:

1. An image processing method comprising steps:
   a computing device receiving an original image including a plurality of colors;
   specifying a number of multiple layers;
   the computing device assigning one of the plurality of colors of the original image to one of the multiple layers;
   determining a height value of one of the multiple layers; and
   the computing device mapping the height value of one of the multiple layers to the original image according to one of the plurality of colors assigned to one of the multiple layers to generate a height image containing a coordinate value and the height value.

2. The image processing method according to claim 1, wherein the number of the multiple layers is generated by the computing device automatically.

3. The image processing method according to claim 1, wherein the number of the multiple layers is specified by the user.

4. The image processing method according to claim 1, wherein the computing device assigns one of the plurality of colors of the original image to one of the multiple layers according to a K-means algorithm, a tone separation method, or a histogram pixel separation method.

5. The image processing method according to claim 1 further comprising a step of the computing device smoothing the multiple layers having neighboring height values.

6. The image processing method according to claim 1 further comprising a step of the computing device mapping a representative color of one of the multiple layers to the original image according to one of the plurality of colors assigned to one of the multiple layers to generate a fewer-color image, wherein the representative color is selected from the colors contained by the layer or specified by the user.

7. The image processing method according to claim 1, wherein the computing device determines the height value of one of the multiple layers according to a chrominance or brightness of a representative color of the layer, and wherein the representative color is selected from the colors contained by the layer or specified by the user.

8. The image processing method according to claim 1, wherein the height value of one of the multiple layers is specified by the user.

9. The image processing method according to claim 1 further comprising a step of the computing device generating a 3D image according to the height image.

10. A scanning system comprising:
a scanning device, scanning an object to generate an original image, wherein the original image includes a plurality of colors; and
a computing device, electrically connected with the scanning device and configured for receiving the original image generated by the scanning device; specifying a number of multiple layers; assigning one of the plurality of colors of the original image to one of the multiple layers; determining a height value of one of the multiple layers; and mapping the height value of one of the multiple layers to the original image according to one of the plurality of colors assigned to one of the multiple layers to generate a height image containing a coordinate value and the height value.

11. The scanning system according to claim 10, wherein the number of the multiple layers is generated by the computing device automatically.

12. The scanning system according to claim 10, wherein the number of the multiple layers is specified by the user.

13. The scanning system according to claim 10, wherein the computing device includes a processing unit, which assigns one of the plurality of colors of the original image to one of the multiple layers according to a K-means algorithm, a tone separation method, or a histogram pixel separation method.

14. The scanning system according to claim 10, wherein the computing device includes a processing unit, which smooths the multiple layers having neighboring height values.

15. The scanning system according to claim 10, wherein the computing device includes a processing unit, which maps a representative color of one of the multiple layers to the original image according to one of the plurality of colors assigned to one of the multiple layers to generate a fewer-color image, wherein the representative color is selected from the colors contained by the layer or specified by the user.

16. The scanning system according to claim 10, wherein the computing device includes a processing unit, which determines the height value of one of the multiple layers according to a chrominance or brightness of a representative color of the layer, and wherein the representative color is selected from the colors contained by the layer or specified by the user.

17. The scanning system according to claim 10, wherein the height value of one of the multiple layers is specified by the user.

18. The scanning system according to claim 10, wherein the computing device includes a processing unit, which generates a 3D image according to the height image.

19. The scanning system according to claim 10 further comprising a 3D printer, which is electrically connected with the computing device and generates a physical object having height differences according to the height image.

* * * * *